Sept. 27, 1955　　　B. O. PRESCOTT ET AL　　　2,719,024
TURNING TOOL FOR WHIPSTOCKS
Original Filed June 16, 1952　　　　　　2 Sheets-Sheet 1
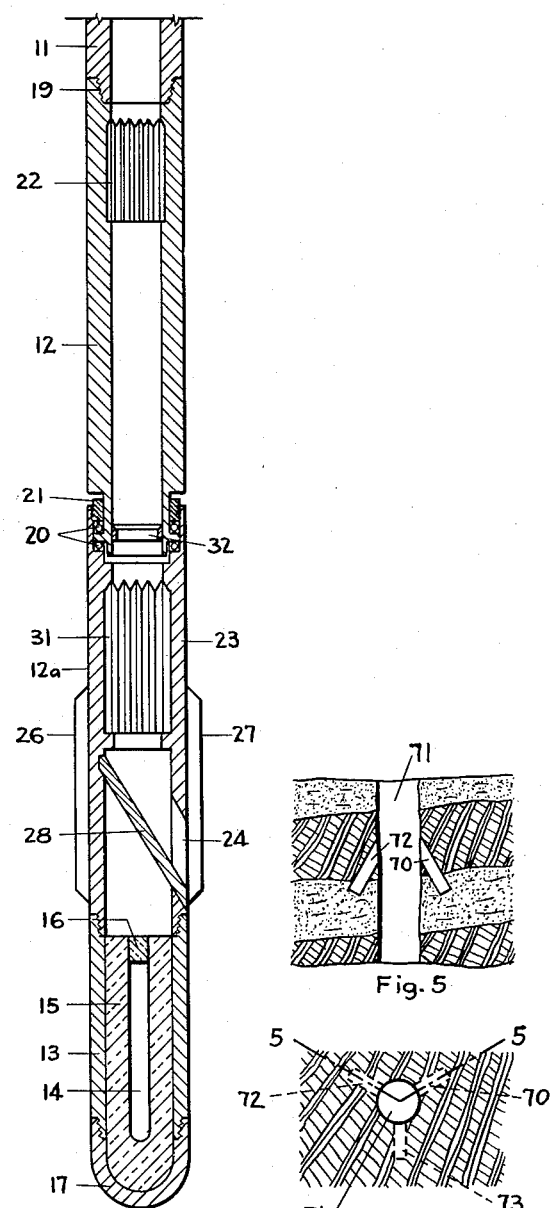
Fig. 1
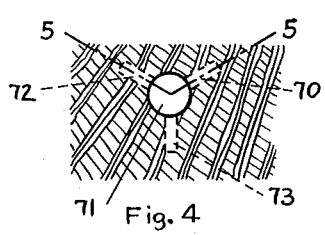
Fig. 5
Fig. 4
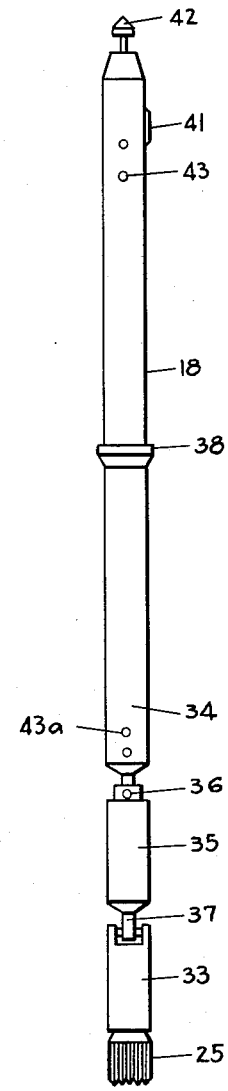
Fig. 3
Inventors: B. O. Prescott
J. E. Wilson
By: [signature]
Their Attorney Sept. 27, 1955 B. O. PRESCOTT ET AL 2,719,024
TURNING TOOL FOR WHIPSTOCKS
Original Filed June 16, 1952 2 Sheets-Sheet 2

Inventors: B.O. Prescott
J.E. Wilson
By: 
Their Attorney

United States Patent Office 2,719,024
Patented Sept. 27, 1955

2,719,024

TURNING TOOL FOR WHIPSTOCKS

Basil Osborne Prescott and James Ernest Wilson, Oklahoma City, Okla., assignors to Shell Development Company, New York, N. Y., a corporation of Delaware Original application June 16, 1952, Serial No. 293,798, now Patent No. 2,710,169, dated June 7, 1955. Divided and this application August 9, 1954, Serial No. 448,652

4 Claims. (Cl. 255—1.6)

This invention relates to a method and an apparatus for determining the oriented position of underground formations and pertains more particularly to a method and apparatus for determining the dip and strike of subsurface strata traversed by a well borehole.

In order to obtain the necessary data for a complete exploration survey of possible oil producing earth formations, it is desirable to ascertain the dip and strike of formations through which a well borehole passes. In the past it has been possible to study the slope or tilt of underground formations by drilling a portion of the borehole with a core bit to obtain core from which information as to the various strata penetrated can be gathered. The angular position of the underground formations in relation to the horizontal can be readily determined by core observations or measurements if the inclination of the borehole is known. However, the dip and strike of the formations cannot be measured from the core unless an oriented core has been obtained as well as data concerning borehole inclination. An accurate determination of the dip and strike of a formation is extremely difficult even with an oriented core drilled coaxially with the borehole due to the small diameter of the core which prevents obtaining accurate measurements. Additionally, it is often desired to make dip and strike formation studies after a well has been drilled, in which case it is impossible to obtain a core taken coaxially from the borehole.

It is therefore an object of the present invention to provide apparatus for obtaining, from a common bedding of an earth formation and preferably at approximately the same level in a single well borehole traversing the bedding, a plurality of oriented sidewall cores from which the dip and strike of formations traversed by the well borehole can be readily determined.

Another object of this invention is to provide a direct and positive method for determining the angular position of subsurface strata.

A further object of this invention is to provide means insertable through a pipe string into a rotary sidewall coring device housing secured to the lower end thereof for rotating said coring device housing through a predetermined angle in a horizontal plane, whereby a plurality of sidewall cores may be consecutively obtained substantially at the same level in a single well borehole without removing the pipe string therefrom.

The geometrical position of a plane in space may be defined by the angle of intersection between the plane (or other planes parallel to the original plane) and each of three lines of known positions, said lines being non-parallel to each other. Similarly, the angular position of an underground formation may be determined from the angle of intersection between the bedding planes of the formation and each of three-non-parallel lines of known position that are obtained by subsidiary core holes from the main boring, or from measurements at the point at which the parallel bedding planes of the formation intersect at least three lines of known orientation and which do not lie in a common plane. It is therefore a further object of the present invention to provide a method and apparatus for obtaining cores of known position from a common level in a well borehole, the axes of said cores radiating from substantially the same point along the axis of the well borehole and forming predetermined angles with each other and with the axis of the borehole.

These and other objects of this invention will be understood from the following description taken with reference to the attached drawings wherein:

Figure 1 is a cross-sectional longitudinal view of a special coring sub having an orienting device secured to its lower end.

Figure 3 is a longitudinal view of a coring device adapted to pass within and partially extend from the coring sub of Figure 1 in a radial direction.

Figure 4 is a plan view illustrating a formation from which three sidewall cores have been taken, the axes of said cores lying at 120 degrees from each other.

Figure 5 is a cross-sectional fragmentary view, taken along the line 5—5 of Figure 4, of a formation traversed by a borehole and from which sidewall cores have been taken at a known angle to the axis of the borehole and to each other.

Figure 6:
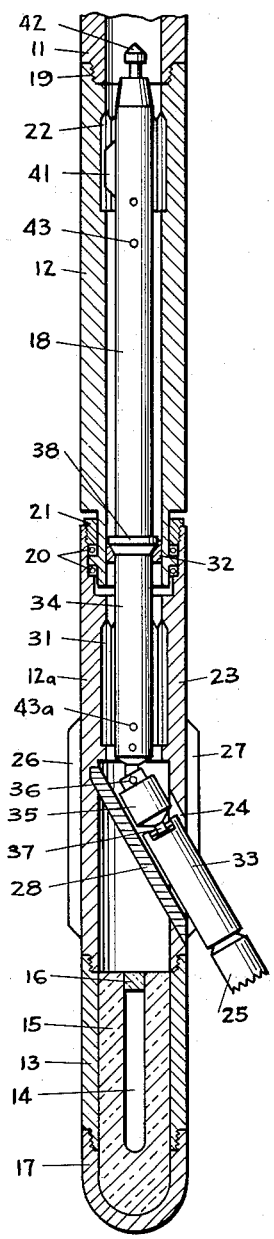
Figure 6 is a longitudinal view, partly in cross-section, of a core drill within the whipstock of the present invention.
Figure 7:
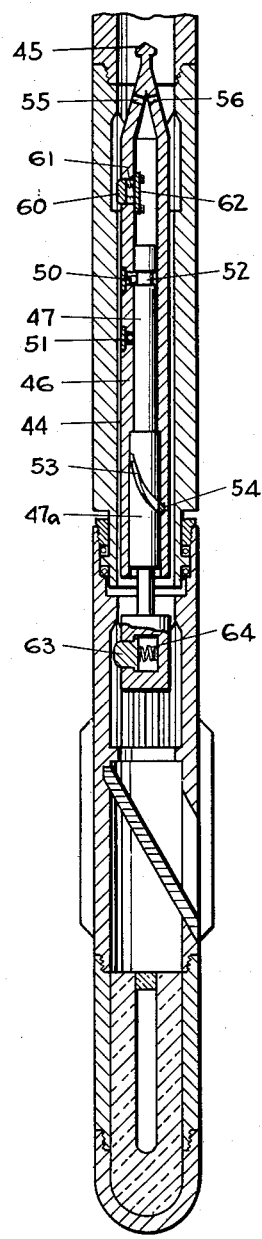
Figure 7 is a longitudinal view, partly in cross-section, of a turning tool contained within the present whipstock.

Referring to the drawing, the apparatus employed for the multiple coring of formations comprises a tubular string of drill pipe 11 (Figure 1) extending from the ground surface, said drill pipe having secured to its lower end a special sub comprising a tubular driving unit 12 and a whipstock unit 12a. The whipstock unit 12a may be closed at its lower end by a cap or other suitable means, but has preferably attached thereto an elongated tubular housing 13 adapted to contain an orienting device or a combined inclinometer and orienting device. Since orienting devices are well known to the art of well drilling and surveying and since their structure and mode of operation form no part of this invention, they will not be further described here and are diagrammatically represented in the drawing by the element 14 centrally positioned in the housing 13. When employing orienting devices containing photographic films, the annular space between the orienting device 14 and the housing 13 is filled with suitable heat resistant insulation 15 closed at the top by a plug 16 of the same material to protect the film and instrument from high temperatures which may be encountered in the well. The lower end of the housing 13 is closed by a cap 17.

The special sub comprising units 12 and 12a of Figure 1 and the sidewall coring device 18 of Figure 3 are of conventional design and may be similar in construction and operation to those described in U. S. Patents Nos. 2,494,932 and 2,510,386 issued to C. O. Denning et al. on January 17 and June 6, 1950, respectively. The driving unit 12 is threadedly connected to the drill string 11 at 19 and is provided on its inner wall with a plurality of spaced ribs 22 extending axially over a portion of its bore.

The driving unit 12 and the whipstock unit 12a are rotatably secured together by an anti-friction bearing assembly, generally represented at 20, which in turn is retained in place by a gland 21 screwed into the top of the whipstock unit 12a. Thus, an efficient swivel connection is formed between the drill string 11 and the whipstock unit 12a whereby the latter may be supported in a well borehole by the former in rotatable relationship therewith.

The whipstock unit 12a comprises a tubular housing 23 provided near its lower end with a slot 24 through the wall thereof. The slot 24 is slightly wider than the diameter of the cutter head 25 (Figure 3) of the coring device 18. Secured on the outside of the housing 23 (Figure 1) is one or more outwardly extending longitudinal ribs 26 and 27 which are employed to hold the whipstock unit 12a centered in a well borehole. It is realized that the centering ribs 26 and 27 alternatively may be secured to the outside wall of housing 13 which is carried by the lower end of the whipstock unit 12a.

Arranged within the lower end of the bore of said whipstock unit 12a in register with the slot 24 is a deflector plate 28 which slopes downwardly toward the bottom of the slot 24. The deflector plate 28 is rigidly secured within the bore of the whipstock unit 12a and serves to deflect the cutter head 25 (Figure 3) of the coring device 18 out through the slot 24 (Figure 1) during coring operations.

Formed within the bore and fixedly secured around the inner wall of the housing 23 near the top thereof are a plurality of axial ribs 31 which extend over a substantial length of the bore for a purpose to be hereinafter stated. Fixedly located within the bore of the driving unit 12 is an annular seat 32.

The coring device 18 employed in the present method and shown in Figure 3 is known as a rotary-type sidewall core barrel. Generally speaking, it comprises a core bit 25, a core barrel 33 and a sectional driving stem consisting of a stem or upper tubular section 34 and a lower tubular section 35. These sections are connected by a universal coupling designated generally by the numeral 36 and the core barrel 33 is connected to the lower end of the section 35 by a similar universal coupling 37. Only one intermediate section 35 of the driving stem is illustrated, although it is apparent that a greater number may be used. The core barrel 33 also may be connected to the upper tubular section 34 by other flexible means, as by a flexible pipe section of the type shown in U. S. Patents Nos. 2,402,003, 2,515,365 and 2,515,366 to J. A. Zublin, the word "flexible" being used herein to include all types.

The body of the coring device 18 is provided with an outside annular collar 38 of a diameter to seat on seat 32 shown in Figure 1. Fixedly attached near the upper end of the coring device 18 (Figure 3) is a longitudinal radially-extending lug 41 adapted to work between the internal ribs 22 of the driving unit 12 of Figure 1. The upper end of the coring device 18 is provided with a fishing head 42 adapted to be engaged by a grappling or fishing tool which may be lowered through the drill string 11 by means of a wire line. One or more ports 43 and 43a (Figure 3) may be provided through the walls of the coring device for circulating fluid therethrough during coring operations.

According to the present method of determining the dip and strike of formations it is necessary that whipstock unit 12a of Figure 1 be rotated about a vertical axis through a predetermined angle. To accomplish this operation a turning tool 44 (Figure 2) is provided. The tool 44 has a fishing head 45 whereby it may be readily lowered into or removed from the drill string 11 and driving unit 12 by means of a wire line equipped with a fishing tool (not shown), adapted to be lowered through the drill string.

Figure 2:
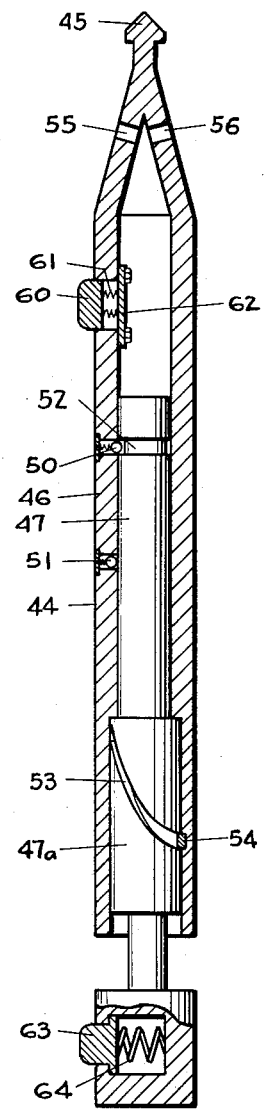
Figure 2 is a longitudinal view, partly in cross-section, of an apparatus for turning the lower end of the coring sub of Figure 1 through a predetermined angle.

The turning tool 44 comprises an elongated tubular housing 46 having mounted for sliding movement therein an elongated piston or plunger 47, having a lower portion 47a of somewhat enlarged diameter. A pair of spring-loaded ball locks 50 and 51 are recessed in the inner wall of the housing 46 to engage an annular groove 52 cut in the surface of the upper part of plunger 47. When the plunger is in its retracted position, the upper ball lock 50 engages the groove 52 as illustrated in Figure 2. The other ball lock 51 engages the groove 52 after the plunger 47 has been rotated at the desired angle. It is realized that any other suitable stop means may be employed instead of the ball locks 50 and 51 for limiting the travel of the plunger 47 in either direction.

Formed or cut in the outer surface of the lower enlarged portion 47a of the plunger 47 is a helical groove 53 or portion thereof which extends circumferentially throughout an angle equal to that through which it is desired to rotate the plunger 47 within its housing 46. For example, if it is desired that the plunger 47 be rotated through an angle of 120 degrees relative to the position of the housing 46, the helical groove 53 would extend one-third of the way around the plunger 47 as illustrated in Figure 2. If, however, the plunger is only to be rotated 90 degrees, the groove 53 would only extend one-quarter of the way around the plunger.

A guide pin 54 is fixedly secured to the inner wall of the housing 46 so as to extend radially into the groove 53 of the plunger. As the plunger 47 is moved axially relative to its housing 46, the pin 54 follows the groove 53, causing the plunger to be rotated. Fluid ports 55 and 56 are provided through the wall of the housing 46 near its upper end to permit a pressure fluid to enter the housing and act against the top of the plunger 47.

Mounted in a retractable position in the wall of the housing 46 is a longitudinal outwardly extending dog or lug 60. The dog 60 is recessed in the wall of the housing and is normally urged into its extended position shown in Figure 2 by one or more springs 61 held in place by a backing plate 62 or other suitable means. A similar retractable dog 63 is recessed in the lower end of the plunger 47a and is urged outwardly by the action of a spring 64.

In determining dip and strike of formations by the present method, three sidewall cores are obtained with a rotary sidewall coring device 18 (Figure 3) adapted to take one core at a time. In order to make an accurate determination of the dip and strike it is necessary to know (1) the angle each core forms with the axis of the well borehole, (2) the angle of inclination of the axis of the borehole with the vertical, (3) the angles formed between the axes of the three cores, and (4) at least the orientation of the first core taken, although the orientation of all three cores is preferred.

In the operation of the present apparatus, a drill string 11 is made up as shown in Figure 1 with the special sub comprising elements 12 and 12a secured to the bottom of said string 11 and a multiple-shot Eastman surveying instrument within the member 14 depending from the sub. Multiple-shot surveying instruments, which are well known to the art of well drilling, are provided with means for periodically recording the orientation of the instrument to which they are attached and are used to record the inclination of the well borehole into which said instrument is inserted. Thus, with the tubular housing 13 fixedly secured to the whipstock unit 12a, the angular relationship between the drill string and the orienting device 14 remains constant. Hence, the azimuth of the whipstock unit 12a when it is originally positioned in a well may be determined or calculated from the azimuth recorded by the surveying instrument 14.

With the drill string 11 and the special sub 12—12a suspended or anchored against longitudinal movement at the desired level in a well borehole where a series of sidewall cores are to be obtained, the coring device 18 (Figure 3) may be dropped or lowered by wire line through the drill string 11. The cutting head 25 of the core barrel 33 lands on the deflector plate 28 of the whipstock unit 12a, which deflects the core barrel 33 out of the slot 24 and against the wall of the borehole. The drill string including tubular elements 11 and 12, is then rotated, while the whipstock unit 12a is held against rotation by the engagement of the core cutter head 25 with the formation. The core is cut by the cutting action of the head 25, which is rotated, together with the whole unit 18, by the engagement of lug 41 with the ribs 22 of the rotating unit 12.

Fluid pressure is applied by a pump (not shown) at the well head, through the drill string 11 and against the top of the coring device when it is positioned in the driving unit 12. The fluid pressure gradually forces the coring device 18 downwardly as it is rotated and a bore 70 (Figures 4 and 5) is formed by the cutter head 25 (Figure 3) in the sidewall of the well bore 71 (Figures 4 and 5) while a cylindrical core (not shown) having a diameter of the same size as the inside diameter of the annular cutter head 25 is received in the bore of core barrel 33. During coring operations fluid may be pumped through ports 43 and 43a (Figure 3) of the coring device 18 and be discharged around the cutter head 25.

When the cutter head has reached the limit of its downward stroke, the annular stop 38 (Figure 3) on the coring device 18 seats on the annular seat 32 (Figure 1) in the driving unit 12 to stop further downward movement of the coring device 18. Rotation of the drill string 11 is stopped and a wire line (not shown) equipped with a latch mechanism to engage fishing head 42 (Figure 3) is dropped through the drill string 11 (Figure 1) and the coring device 18 (Figure 3) is pulled to the surface and removed from the drill string 11 (Figure 1).

The turning tool 44 (Figure 2) is then dropped or lowered by wire line through the drill string and into the special sub 12—12a so that the upper dog 60 engages one of the grooves 22 (Figure 1) on the inner wall of the driving unit 12 while the lower dog 63 (Figure 2) fits into one of the grooves 31 (Figure 1) in the whipstock unit 12a. During the passage of the turning tool 44 (Figure 2) through the drill string 11 (Figure 1) the dogs 60 and 63 are forced into their recesses against the actions of springs 61 and 64 respectively so that they are substantially flush with surface of the turning tool 44 until they are in register with the top of grooves 22 and 31, respectively.

When the turning tool 44 is in place within sub 12—12a, pressure fluid is pumped down through the drill string 11 (Figure 1), and through the ports 55 and 56 (Figure 2) into the turning tool 44. The pressure fluid acts against the top of the plunger 47 forcing it downwardly so that it unlatches the ball lock 50. The plunger 47 continues moving axially within its housing 46 with the pin 54 moving along the groove 53 causing the plunger to rotate through the desired angle, for example 120 degrees by the time the pin 54 has reached the upper end of the groove 53.

Since the lower dog 63 of the turning tool 44 (Figure 2) engages ribs 31 (Figure 1) of the whipstock unit 12a, rotation of the plunger 47 of the turning tool 44 causes a like rotation of the whipstock unit 12a on its ball bearings 20, thus rotating the slot 24 to another sector of the borehole wall for taking a second core. The orienting device 14 carried below the whipstock unit 12a rotates with said unit 12a and thereafter records the azimuth at the new position.

The turning tool 44 is then removed from the sub 12—12a by a wire line and the coring device 18 (Figure 3) is again dropped through the drill string 11 and into the sub 12—12a and a second core is taken forming a second bore 72, as shown in Figures 4 and 5. The turning and coring operations are repeated a third time with first the turning tool 44 being inserted into sub 12—12a to turn the whipstock unit 12a through another arc of substantially 120 degrees and then the tool 44 being removed and the coring device 18 being inserted to cut a third radially-extending and downwardly slanting bore 73 (Figure 5) in a manner previously described.

Thus, by use of the above-described apparatus, three downwardly-slanting sidewall cores are obtained at the same level in a well borehole with a rotary-type sidewall coring device. Since the multiple-shot orienting device 14 recorded the azimuth of the sub 12—12a and hence that of the coring device 18 when positioned therein, the angle formed between the axes of any two cores is known. If a single-shot orienting device is employed whereby only the original orientation of the sub 12—12a is obtained wherein the first core is taken, the angle formed between the axis of the first core and that of subsequent cores will be known from the design of the turning tool 44 (Figure 2) which, in this case, is designed to turn the whipstock unit through a 120 degree angle, at which point the second core is taken.

The angle between the axes of the cores and the axis of the sub 12—12a is always constant and is known from the angle at which the deflector plate 28 of the whipstock unit 12a is sloped. If the axis of the borehole deviates from the vertical, its inclination is recorded by the use of an inclinometer which may be contained in the orienting device.

The oriented cores obtained by a rotary coring device in the above-described manner are of considerable length and have clean-cut surfaces, being, general, superior to sidewall cores obtained by coring devices which punch rather than cut the cores from the formation. Thus, a study of the cores obtained by the present method clearly indicates the line of demarcation between two strata or beds of the underground formation and as well as the angle formed between this line and the axis of the core, which angle may be readily measured. Since the relative position of the cores in space may be determined from the data acquired during coring operations and since the angle formed between each of the cores and plane of a formation bed indicated on the cores may be measured thereon, the angular position of the sub-surface strata from which the cores were obtained may be readily determined.

While the present method has been described with regard to the preferred mode of operation in which cores are taken at substantially the same level in a borehole, it is realized that many well borehole traverse a formation, or formations, showing parallel bedding. In areas where parallel bedding exists, the strike and dip of the formations may be readily determined by the present method with the oriented cores being taken at considerable intervals apart along the vertical axis of the borehole.

This application is a division of the copending application Serial No. 293,798, filed June 16, 1952, now Patent No. 2,710,169 issued June 7, 1955.

We claim as our invention:

1. In combination with a well installation having a string of pipe suspended in said well, said pipe string having a rotatable connection therein and anchoring means carried on the inner wall of said pipe string above and below said rotatable connection, a turning tool adapted to be lowered through the pipe string comprising an elongated cylinder, a plunger member substantially carried within said cylinder and mounted for downward extension from one end of said cylinder, port means through said cylinder wall near the other end of said cylinder for admitting a pressure fluid into said cylinder to actuate said plunger member, and radial stop means carried exteriorly by said cylinder and by said plunger member for engaging the anchoring means on either side of said rotatable connection respectively, the contacting cylindrical surfaces of said cylinder and plunger member being provided with cooperating helical guide-way means whereby the axial motion of the plunger member caused by the application of fluid pressure thereto causes a rotation of the plunger member together with the section of pipe string below the rotatable connection to which it is anchored.

2. In combination with a well installation having a string of pipe suspended in said well, said pipe string having a rotatable connection therein and anchoring means carried on the inner wall of said pipe string above and below said rotatable connection, a turning tool adapted to be lowered through the pipe string comprising an elongated cylinder, a plunger member substantially carried within said cylinder and mounted for downward extension from one end of said cylinder, port means through said cylinder wall near the other end of said cylinder for admitting a pressure fluid into said cylinder to actuate said plunger member, radial stop means carried exteriorly by said cylinder and by said plunger member for engaging the anchoring means on either side of said rotatable connection respectively, and registering pin and guide means, one of said means carried by said cylinder and the other by said plunger member whereby the axial motion of the plunger member caused by the application of fluid pressure thereto causes a rotation of the plunger member together with the section of pipe string below the rotatable connection to which it is anchored.

3. In combination with a well installation having a string of pipe suspended in said well, said pipe string having a rotatable connection therein and first and second axial keyslot means carried on the inner wall of said pipe string above and below said rotatable connection respectively, a turning tool adapted to be lowered through the pipe string comprising an elongated tubular element, a plunger element mounted for reciprocation therein, port means through the cylinder wall above said plunger element for admitting a pressure fluid into said tubular element, the contacting cylindrical surface of said piston element being provided with a helical guideway extending around a portion of the curved surface thereof, a pin element affixed to the inner wall of the tubular element of said turning tool and adapted to slide in the helical guideway, a radially extending upper lug outwardly carried by said tubular element, a radially extending lower lug carried near the lower end of said plunger outside of said tubular element, said upper and lower lugs being spaced from each other by a distance such as to engage simultaneously said first and second axial key-slot means in said pipe string above and below said rotatable connection, whereby said pipe section below said rotatable connection is caused to rotate through a desired angle with regard to the pipe string above said connection when said plunger element is forced downwardly by fluid pressure applied through the pipe string.

4. In combination with a well installation having a string of pipe suspended in said well, said pipe string having a rotatable connection therein and anchoring means carried on the inner wall of said pipe string above and below said rotatable connection, a turning tool adapted to be lowered through the pipe string comprising an elongated tubular element, a plunger element mounted for reciprocation therein, port means through the cylinder wall above said plunger element for admitting a pressure fluid into said tubular element, the contacting cylindrical surface of said piston element being provided with a helical guideway extending substantially 120° around the curved surface thereof, a pin element affixed to the inner wall of the tubular element of said turning tool and adapted to slide in the helical guideway, a radially extending upper lug outwardly carried by said tubular element, a radially extending lower lug carried near the lower end of said plunger outside of said tubular element, said upper and lower lugs being spaced from each other by a distance such as to engage simultaneously said anchoring means in said pipe string above and below said rotatable connection, whereby said pipe section below said rotatable connection is caused to rotate with regard to the pipe string above said connection when said plunger element is forced downwardly by fluid pressure applied through the pipe string.

No references cited.